(12) United States Patent
Kim

(10) Patent No.: US 7,239,597 B2
(45) Date of Patent: Jul. 3, 2007

(54) LENS FOR OPTICAL RECORDING AND REPRODUCING SYSTEM

(75) Inventor: Young-Sik Kim, Yongin (KR)

(73) Assignee: LG Electronics Inc., Seoul (KR)

( * ) Notice: Subject to any disclaimer, the term of this patent is extended or adjusted under 35 U.S.C. 154(b) by 777 days.

(21) Appl. No.: 10/092,650

(22) Filed: Mar. 5, 2002

(65) Prior Publication Data

US 2002/0131357 A1    Sep. 19, 2002

(30) Foreign Application Priority Data

Mar. 17, 2001   (KR) .............................. 2001-13910

(51) Int. Cl.
   *G11B 7/00*   (2006.01)
(52) U.S. Cl. ............................ 369/112.23; 369/112.28; 369/112.25; 369/112.08
(58) Field of Classification Search ........... 369/112.08, 369/112.09, 112.2, 112.25, 112.28, 112.23
See application file for complete search history.

(56) References Cited

U.S. PATENT DOCUMENTS

| | | | | |
|---|---|---|---|---|
| 4,866,694 | A * | 9/1989 | Korth ....................... | 369/44.12 |
| 6,392,978 | B1 * | 5/2002 | Sato ........................... | 369/118 |
| 6,700,856 | B2 * | 3/2004 | Ueyanagi ................ | 369/112.23 |
| 6,801,492 | B2 * | 10/2004 | Lee et al. ............... | 369/112.26 |
| 6,940,803 | B2 * | 9/2005 | Hatano .................. | 369/112.23 |
| 2002/0136146 | A1 * | 9/2002 | Lee et al. ............... | 369/112.23 |
| 2005/0083827 | A1 * | 4/2005 | Yamasaki et al. ....... | 369/112.28 |

FOREIGN PATENT DOCUMENTS

| JP | 5297244 | 11/1993 |
|---|---|---|
| JP | 6308355 | 11/1994 |
| JP | 8292371 | 11/1996 |
| JP | 11337826 | 12/1999 |

\* cited by examiner

*Primary Examiner*—Tan Dinh
*Assistant Examiner*—Adam R. Giesy
(74) *Attorney, Agent, or Firm*—Lee, Hong, Degerman, Kang & Schmadeka

(57) ABSTRACT

A lens for an optical recording and reproducing system includes: a plane of incidence on which a light generated from a light source is made incident; a first reflection side for reflecting a light passing through a plane of incidence; and a second reflection side for reflecting again the light that has been reflected on the first reflection side, the second reflection side being formed to be an ellipsoid side, and the first reflection side and the second reflection side being coated with a reflection material. A very small optical system in its size and weight is possibly constructed, so that information recording and reproducing can be possible only with one focussing lens without a necessity of an objective lens. Accordingly, an ultra-thin optical recording and reproducing system of which height is remarkably reduced can be provided. In addition, since the weight of the head portion can be reduced and the entrance pupil of the light source can be made small, a power consumption of a driving unit and an overall system can be much reduced.

7 Claims, 5 Drawing Sheets

LENS FOR OPTICAL RECORDING AND REPRODUCING SYSTEM

CROSS-REFERENCE TO RELATED APPLICATIONS

Pursuant to 35 U.S.C. §119(a), this application claims the benefit of earlier filing date and right of priority to Korean Application No. 13910/2001 filed Mar. 17, 2001 the contents of which are hereby incorporated by reference herein in its entirety.

BACKGROUND OF THE INVENTION

1. Field of the Invention

The present invention relates to an optical system for an optical recording and reproducing system, and more particularly, to an optical system for an optical recording and reproducing system that is capable of reducing a thickness and volume of a lens and of performing a ultra-high density information recording.

2. Description of the Background Art

In order for an optical recording medium or an optical magnetic recording medium to have a high density recording capacity, a bit (or a record mark) size should be small and a track width should become narrow.

However, since the spot size of a light focussed on a recording medium to form a bit on a record film of the recording medium is restricted by a diffraction limitation, it has a limitation to improvement of a recording density.

According to the tendency that a large amount of information is to be stored, a fresh optical recording/reproducing method is requested to overcome the limitation of the existing optical recording/reproducing method.

Recently, researches are being increasingly conducted on a near field recording/reproducing using a near field, because it is anticipated to remarkably enhance the recording capacity.

The near field optical recording and reproducing is based on the following principle.

As for a light made incident into a lens with an angle more than a critical angle, when it proceeds from a portion where a refractivity is dense to a portion where a refractivity is coarse, the light is totally reflected.

At this time, owing to the total reflection, an infinitesimal strength of light exists on the surface of the lens, which is called an evanescent wave or a dissipation wave. Use of the evanescent wave enables a high resolution which has been not possible due to an absolution limitation of the resolution, that is, a diffraction limitation, caused due to a diffraction phenomenon of light in the existing far-field.

In the near field optical recording and reproducing optical system, light is fully reflected within a lens to generate an evanescent wave on the surface of the lens, and a recording and reproducing is performed by a coupling of the evanescent wave and the recording medium.

FIG. 1 is a perspective view showing a near field optical recording system 10.

A central portion of a disk 11, a recording medium, is mounted to be rotatable at a spindle motor (not shown) in a deck 18, and a recording and reproducing unit is installed at the portion therein.

At an upper surface of the disk a flying head slider 12 including a lens (19) thereon is supported by a suspension arm 14, and one side of the suspension arm is connected to a pick-up unit 17.

At a lower portion of the pick-up unit, a voice coil motor (VCM) 16 is installed, so that the pick-up unit can rotated at a certain range of angle.

Meanwhile, a fixing arm 13 is installed to be supported by the pick-up unit, and a prism 15 is installed at the end of the fixing arm.

Light generated from a light source (not shown) of the pick-up unit is changed in its path at the prism to pass the lens (not shown) mounted at the head slider and is finally made incident on the surface of the disk.

According to interaction between the incident light and the surface of the disk, light information can be recorded or reproduced.

FIG. 2 is a schematic enlarged view showing the optical system mounted at the head slider in the system of FIG. 1.

The optical system includes a hemispheric solid immersion lens (SIL) 22 and a first condensing lens 21.

The SIL is formed hemispheric shape of which an upper portion is spherical and a lower surface is plane, and it is installed so that the center of the plane portion of the SIL corresponds to a focus of the first condensing lens.

Accordingly, the light 24 made incident on the first condensing lens is refracted to be collected at the center of the lower plane portion of the SIL.

In order to record a data (a bit) on the disk by using the SIL, as shown in FIG. 2, the SIL comes near the surface of the recording medium 23 with very small space, that is, for example, with a space of 10~70 nm.

Then, an optical near field phenomenon takes place that a portion of the optical energy first focussed at the lower surface of the SIL is transferred to the recording medium. Thanks to the near field phenomenon, it is possible to record or reproduce a data in or from the surface of the recording medium.

For example, the energy transferred from the SIL heats a portion of the surface of the recording medium, causing a local phase change. Bits are formed on the surface of the recording medium owing to the phase change. That is, information is recorded.

In case of reading information, a characteristic that a refractivity differs at the portion where the phase change has been made locally is used. A light having a lower strength than that of a light for recording is made incident through the SIL, and then the strength of the light coming through the SIL after being reflected on the surface of the recording medium is measured by means of an optical sensor. Then, since the refractivity differs according to existence and non-existence of bit, information can be read.

Though the conventional optical system using the SIL has an advantage that a diffraction limitation of light is overcome and light spot can be reduced, it also has the following problems.

That is, generally, an aberration that a light is not focussed to one point occurs in the optical lens. The aberration has a characteristic that it becomes greater as the magnification of a lens is higher.

Since the optical system using the SIL requires a first condensing lens of a large magnification, the aberration of the first condensing lens much degrades a first condensing performance of the optical system.

In addition, since the data recording and reproducing lens using the SIL requires the first condensing lens, the device is enlarged in its volume and complicated, and it is difficult to assemble an entire data storing unit and the first condensing lens.

Especially, since there is a limitation to reducing the height of a head slider where the lens is mounted, it is difficult to manufacture an ultra-thin optical recording and reproducing system that can be mounted at a mobile instrument.

SUMMARY OF THE INVENTION

Therefore, an object of the present invention is to facilitate assembling of an optical system and an entire system by reducing a volume and a thickness of the optical system, to thereby provide an ultra-slim optical recording and reproducing system.

Another object of the present invention is to provide an optical system for an optical recording system that is capable of recording and reproducing information only by using a focusing lens without a condensing lens.

To achieve these and other advantages and in accordance with the purpose of the present invention, as embodied and broadly described herein, there is provided a lens for an optical recording and reproducing system including: a plane of incidence on which a light generated from a light source is made incident; a first reflection side for reflecting a light passing through a plane of incidence; and a second reflection side for reflecting again the light that has been reflected on the first reflection side, the second reflection side being formed to be an ellipsoid side, and the first reflection side and the second reflection side being coated with a reflection material.

An incident beam is converged to one of focal points of ellipsoidal side, and the focal point can be positioned on the first reflection side. Besides, the focal point can be positioned so that the incident beam is converged to a portion lower than the first reflection side.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
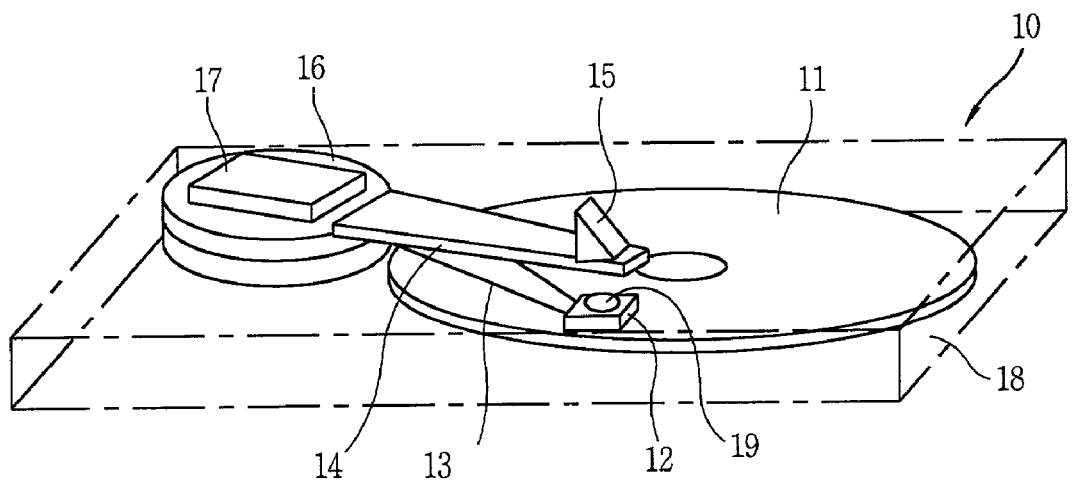
FIG. 1 is a perspective view showing a near field optical recording system in accordance with a conventional art.
Figure 2:
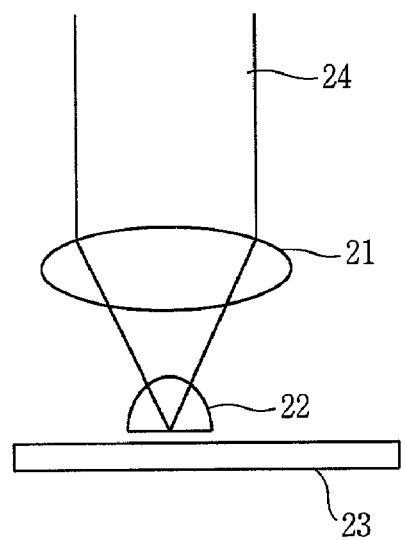
FIG. 2 is an enlarged schematic view showing an optical system mounted at a head slider of the near field optical recording system of FIG. 1 in accordance with the conventional art.
Figure 3A:
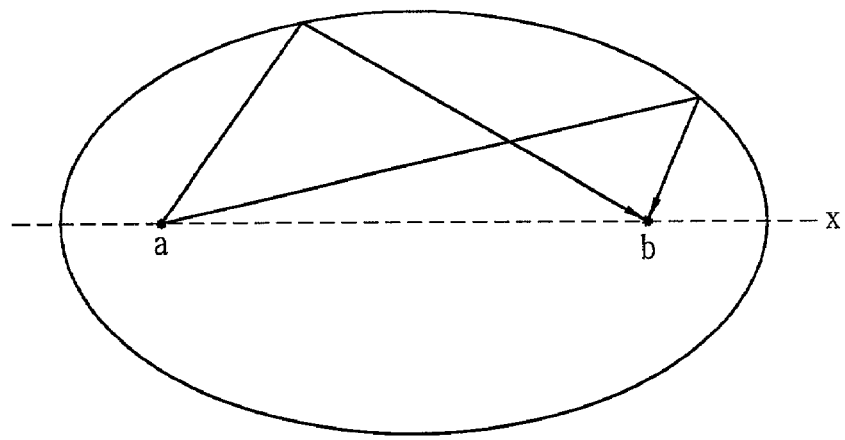
FIG. 3A is a schematic view showing a geometric characteristic of an ellipsoid.

FIG. 3A is a schematic view showing a principle of the present invention.

An ellipsoid is defined by a trace of points that sums of distances between two points are the same. Owing to the geometric characteristics of the ellipsoid, if a line passing a focal point (a) as shown in FIG. 3A is reflected from the ellipsoidal side, it passes a different focal point (b).

Employing the characteristics, the present invention provides a lens having reflection sides, one of which is formed as an ellipsoidal side.

Figure 3B:
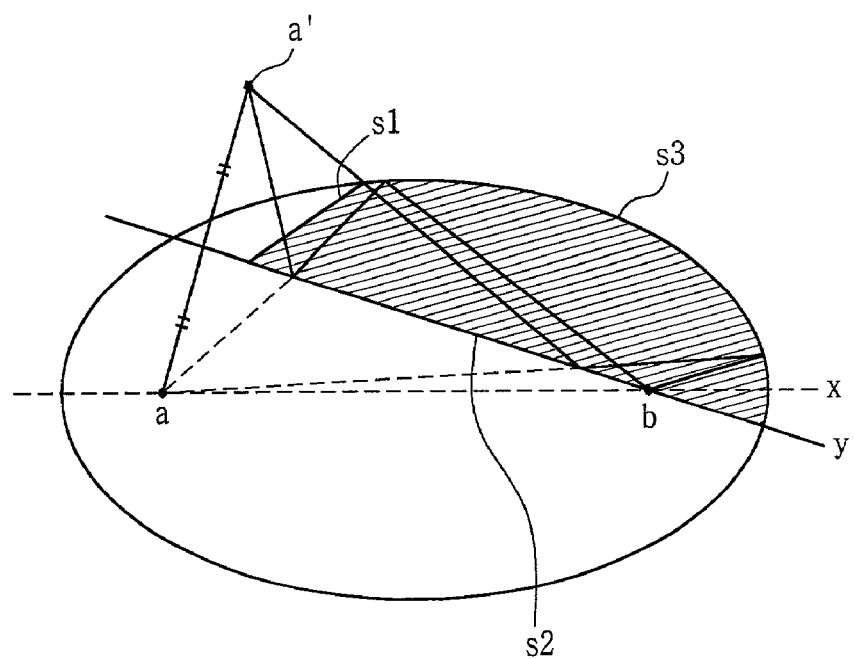
FIG. 3B is a schematic view showing a principle of the present invention.

With reference to FIG. 3B, an ellipsoid is cut at a reference line (y) passing a focal point (b), and a path of light passing a point (a') symmetrical to a different focal point (a) for the reference line (y) was checked and shown.

When a reflection material is coated at the cut side (s2) and the ellipsoidal side (s3), the light passing the symmetrical point (a') is reflected from the cut side (s2) and made incident on the ellipsoidal side (s3), and again reflected from the ellipsoidal side and converged to the focal point (b) of the ellipsoid position on the cut side.

Reference numeral (s1) corresponds to an incident portion of light. It is necessary to change a form of the incident portion according to a degree that an incident beam is refracted within the ellipsoid.

The light passing the point symmetrical to one focal point of the ellipsoid is reflected from the cut side and the ellipsoidal side and converged to the other focal point of the ellipsoid with small aberration, and theoretically, close to '0'.

Figure 4A:
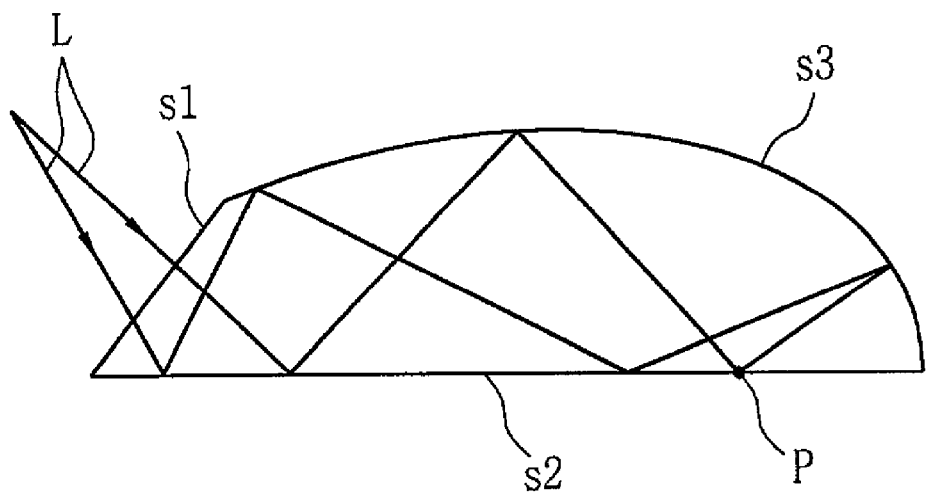
FIG. 4A is a sectional view showing an optical lens having an ellipsoidal side in accordance with a first embodiment of the present invention.

FIG. 4A is a sectional view showing an optical lens having an ellipsoidal side in accordance with a first embodiment of the present invention.

As shown in FIG. 4A, the side where a focal point (P) of the lens is positioned is level with the bottom surface.

Substantially, in an optical recording system, the lens is preferably positioned at a head in this manner, because light (L) generated from a light source can be made incident horizontally on a lens incident portion.

One side of the lens is formed as a plane of incidence on which light (L) is made incident, and a lower surface of the lens is a first reflection side (s2) from which an incident light is reflected, and an upper surface of the lens corresponds to a second reflection side (s3), an ellipsoidal side.

The focal point of the ellipsoidal side is the point 'P' formed at one side of the first reflection side, and light made incident on the lens penetrates a point symmetrical to the other focal point of the ellipsoid and the first reflection side.

The first reflection side and the second reflection side are coated with a reflection material so that the incident beam can be smoothly reflected.

In the present invention, a light with a small spot can be formed only with one focussing lens without a necessity of an objective lens.

In addition, the height of the lens is very low, and preferably, it can be fabricated to have a height of below 0.3 mm, ensuring an ultra-thin type system with an optical recording system of which overall thickness is considerably reduced.

Besides, the lens of the present invention can make light to directly be incident on the incident portion, without a necessity of a converting unit such as a prism to change a path to make a light to be incident on the incident portion of the lens from the light source, so that the height and weight of the head portion where the lens is mounted can be reduced, and accordingly, a load of the driving unit for driving the head portion can be reduced.

Figure 4B:
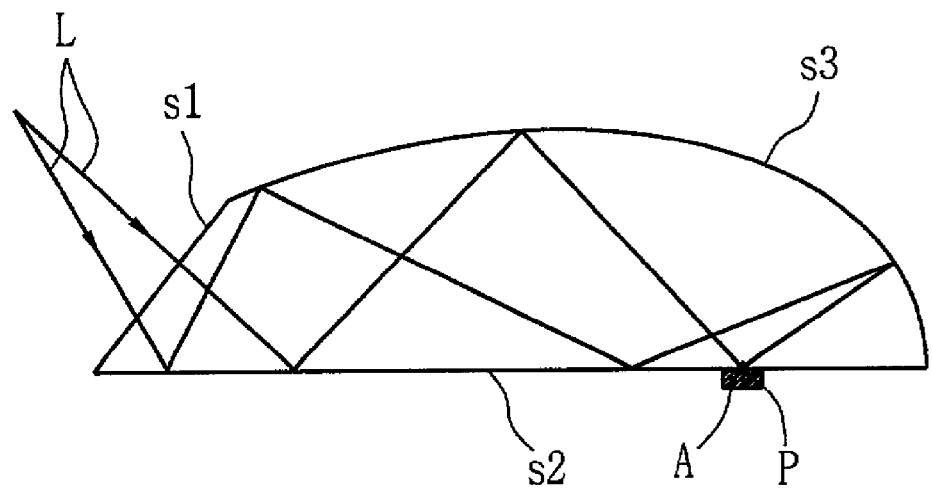
FIG. 4B is a drawing illustrating a lens having a step formed at a focal point in accordance with a second embodiment of the present invention.

FIG. 4B is a drawing illustrating a lens having a step (A) formed at a focal point in accordance with a second embodiment of the present invention.

Formation of a step (A) helps to prevent a bad influence to recording and reproducing because an optical interaction takes place between a portion other than the focal point at the bottom surface of the lens and the recording medium and also prevents a contaminant from interfering an optical interaction between the lens and the recording medium.

The material to form the step should be a transparent material so as to transmit light, and the step is preferably formed to have a size of about 0.1~100 nm, so that it may not cause a trouble to recording and reproducing of information.

By performing an aperture coating at the focal point portion, the spot size of the focussed light can be more reduced.

Figure 5:
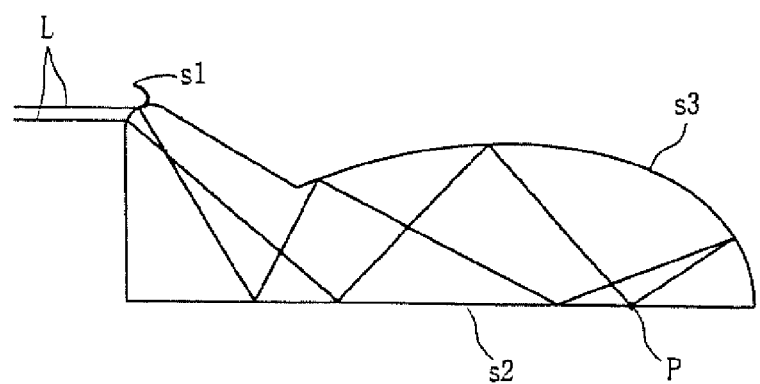
FIG. 5 is a drawing illustrating a lens with a convex plane of incidence in accordance with a third embodiment of the present invention.
Figure 6:
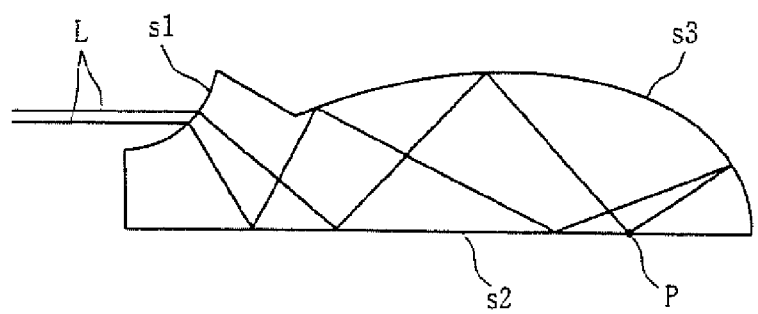
FIG. 6 is a drawing illustrating a lens with a concave plane of incidence in accordance with a fourth embodiment of the present invention.
Figure 7:
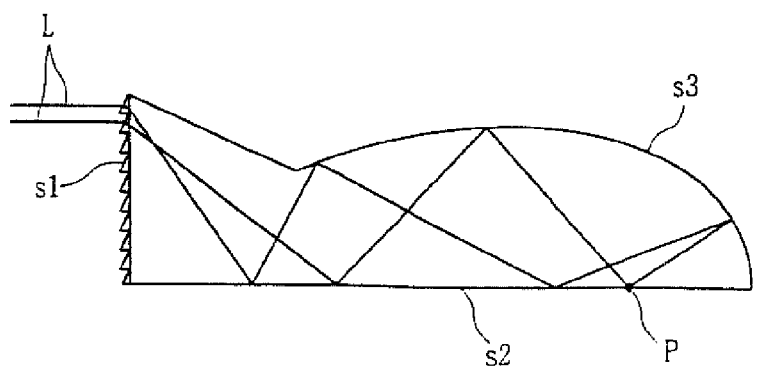
FIG. 7 is a drawing illustrating a lens having a hologram formed at a plane of incidence in accordance with a fifth embodiment of the present invention.

FIGS. 5 through 7 show different embodiments of the present invention, in which a plane of incidence of lens is formed at the same position as a point symmetrical to a different focal point ('a' of FIG. 3B) of the ellipsoid.

FIG. 5 is a drawing illustrating a lens with a convex plane of incidence in accordance with a third embodiment of the present invention, and FIG. 6 is a drawing illustrating a lens with a concave plane of incidence in accordance with a fourth embodiment of the present invention.

The plane of incidence of lens is formed to be relatively small compared to the embodiment of FIG. 4A, and thus, an entrance pupil generated from the light source can be made small.

In addition, if the plane of incidence is formed convex or concave, when light proceeds into the lens, it can be more spread or narrowly converged, so that various modification can be possible in designing according to a use purpose of the lens.

FIG. 7 is a drawing illustrating a lens having a hologram formed at a plane of incidence (s1) in accordance with a fifth embodiment of the present invention.

As shown in FIG. 7, a hologram is formed at the plane of incidence (s1) of the lens.

The hologram formed at the plane of incidence allows a diffraction angle and a fracture aberration to be controllable, so that a tolerance margin can be great, and in this aspect, the hologram is advantageous.

Figure 8:
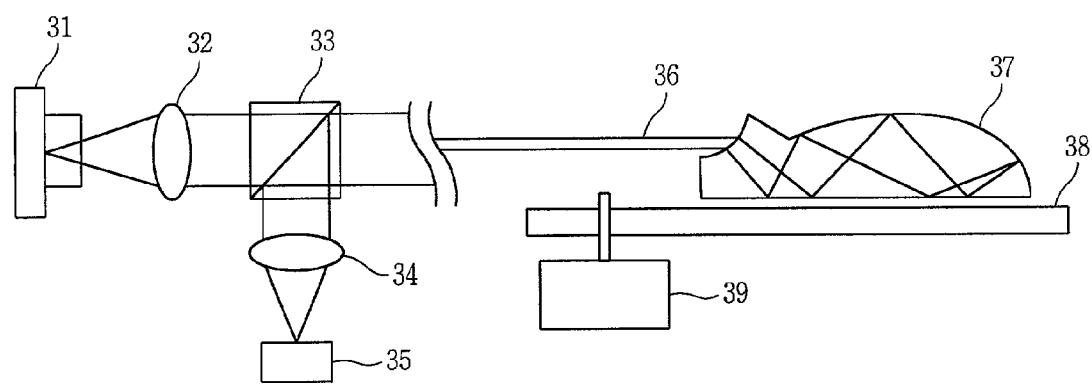
FIG. 8 is a schematic view showing an optical recording system having a lens in accordance with the preferred embodiment of the present invention.

FIG. 8 is a schematic view showing the construction of an optical recording and reproducing system having the lens in accordance with a preferred embodiment of the present invention.

The light generated from the light source 31 is converted into a parallel beam as it passes a collimation lens 32, and reaches the focussing lens 37 after passing through a beam splitter 33.

The light (36) converted to the focusing lens makes an optical magnetic interaction with the surface of the recording medium 38 being rotated by the motor 39, to thereby record or reproduce information.

Information reproduction is performed in such a manner that a light reflection from the recording medium 39 passes the focussing lens 37, reaches the beam splitter 33, is separated to a different direction to the incident beam, passes the collimation lens 34 and is sensed by an optical sensing unit 35.

In FIG. 8, the focussing lens 37 is illustrated relatively large, but actually it is very small and mounted at the head portion (not shown) of a system.

Since the size and weight of the lens is very small, servo of the lens is very easy in the system, and the lens of the present invention can be adopted to both to an integrated type pick-up and to a separated type pick-up.

In addition, in order to mount the lens, the head of a hard disk can be used as it is, so that an access time can be reduced.

As so far described, the lens for an optical recording and reproducing system of the present invention has the following advantages.

That is, for example, a very small optical system in its size and weight is possibly constructed, so that information recording and reproducing can be possible only with one focussing lens without a necessity of an objective lens.

Accordingly, an ultra-thin optical recording and reproducing system of which height is remarkably reduced can be provided.

In addition, since the weight of the head potion can be reduced and the entrance pupil of the light source can be made small, a power consumption of a driving unit and an overall system can be much reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A lens for an optical recording and reproducing system comprising:
   a plane of incidence on which a light generated from a light source is made incident;
   a first reflection side for reflecting a light passing through a plane of incidence; and
   a second reflection side for reflecting again the light that has been reflected on the first reflection side, the second reflection side being formed to be an ellipsoid side, and the first reflection side and the second reflection side being coated with a reflection material,
   wherein one of two focal points of ellipsoidal side is positioned on the first reflection side, and a point symmetrical to the other focal point of the ellipsoidal side with respect to the first reflection side is positioned on the same side of the reflection side as the plane of incidence.

2. The lens of claim 1, wherein a step is formed at the focal point portion of the first reflection side.

3. The lens of claim 2, wherein the step has a size of 0.1~100 nm.

4. The lens of claim 1, wherein the plane of incidence is formed convex.

5. The lens of claim 1, wherein the plane of incidence is formed concave.

6. The lens of claim 1, wherein a hologram is formed at the plane of incidence.

7. The lens of claim 1, wherein one of the two focal points of the ellipsoidal side is positioned lower than the first reflection side.

* * * * *